United States Patent [19]

Lawes

[11] 4,138,143
[45] Feb. 6, 1979

[54] LOOSE LEAF BINDERS

[76] Inventor: Michael J. A. Lawes, 11 Jew St., Brighton, Sussex, BN1 1UT, England

[21] Appl. No.: 475,126

[22] Filed: May 31, 1974

Related U.S. Application Data

[63] Continuation of Ser. No. 100,310, Dec. 21, 1970, abandoned, Continuation-in-part of Ser. No. 21,652, Mar. 23, 1970, abandoned.

[30] Foreign Application Priority Data

| Jan. 5, 1970 | [GB] | United Kingdom | 400/70 |
| Jul. 22, 1970 | [GB] | United Kingdom | 35453/70 |
| Mar. 19, 1970 | [CA] | Canada | 077831 |
| Mar. 18, 1970 | [FR] | France | 70.09745 |
| Mar. 10, 1970 | [DE] | Fed. Rep. of Germany | 2011111 |
| Mar. 10, 1970 | [DE] | Fed. Rep. of Germany | 7008623[U] |
| Jun. 9, 1970 | [NL] | Netherlands | 7008341 |

[51] Int. Cl.$^2$ .................. B42D 13/00; B42D 3/02
[52] U.S. Cl. ........................................ 281/47; 281/29
[58] Field of Search .............. 281/46, 47, 48, 49, 281/29

[56] References Cited

U.S. PATENT DOCUMENTS

| 1,143,562 | 6/1915 | West | 281/48 |
| 1,246,243 | 11/1917 | Daniels | 281/46 |
| 1,495,467 | 5/1924 | White | 281/29 |
| 2,322,298 | 6/1943 | Johnston | 281/29 UX |
| 2,390,125 | 12/1945 | Schade | 281/47 |
| 2,790,651 | 4/1957 | Winstead | 281/29 |
| 2,809,852 | 10/1957 | Miller | 281/29 |
| 2,960,090 | 11/1960 | Schugart | 281/47 |
| 3,190,678 | 6/1965 | Peterson et al. | 281/29 |
| 3,596,928 | 8/1971 | Edmonds | 281/46 |

FOREIGN PATENT DOCUMENTS

| 1047746 | 12/1958 | Fed. Rep. of Germany | 281/29 |
| A63053 | 3/1955 | France | 281/29 |
| 1151165 | 8/1957 | France | 281/48 |
| 490869 | 2/1954 | Italy | 281/29 |
| 259835 | 7/1949 | Switzerland | 281/46 |
| 557596 | 11/1943 | United Kingdom | 281/47 |
| 605956 | 8/1948 | United Kingdom | 281/46 |
| 844572 | 8/1960 | United Kingdom | 402/75 |

Primary Examiner—Jerome Schnall
Attorney, Agent, or Firm—Roylance, Abrams, Berdo & Farley

[57] ABSTRACT

The invention relates to loose leaf binders for holding periodicals and the object of the invention is to provide a loose leaf binder having a curved back and no rivets visible from the back.

For this purpose, the paper-retaining means are fitted to an inner flat spine which is connected to the covers by means of welds extending along the hinge lines between the covers and the outer spine. The covers consist of boards enclosed in flexible polyvinyl chloride sheeting and the outer spine is reinforced with a semi-rigid polyvinyl chloride strip. The inner spine consists of a strip of board enclosed in flexible polyvinyl chloride sheeting, the width of the sheeting being greater than the width of the board strip so that flexible hinges are produced on each side of the strip. When the inner spine is assembled with the covers and outer spine, the welds are produced along the hinge lines so that there is no tendency to tear out the inner spine when the covers are opened and closed.

15 Claims, 6 Drawing Figures

LOOSE LEAF BINDERS

This application is a continuation of application Ser. No. 100,310 filed Dec. 21, 1970 which is a continuation in part of application Ser. No. 21,652 filed Mar. 23, 1970, both of which are now abandoned.

This invention relates to loose leaf binders of the kind used for holding sheets of paper, either already bound or stapled together in groups, for example, in the form of booklets or periodicals, or unbound but folded down the middle in groups in the manner of booklets or periodicals.

It is an object of the invention to provide a loose leaf binder which can be constructed so that it has a pleasing appearance similar to that of a bound volume having a curved back and no rivets or other metal parts visible from the back of the binder.

From one aspect the invention consists in a loose leaf binder including two covers hingeable with respect to an outer curved spine, wherein an inner flat spine is hingedly connected to said covers by means of welds extending substantially along the hinge lines between the covers and the outer spine, and wherein paper-retaining means are provided on said inner spine.

Preferably, each of said covers consists of a board covered on the outside with flexible, weldable material and possibly also covered on the inside with such material. However, the covering on the inside may be a sheet of semi-rigid material instead of flexible material. The term "board" is used herein to include not only cardboard such as is normally used to stiffen the covers of loose leaf binders, but also any rigid synthetic resin material having properties similar to those of cardboard. The term "semi-rigid material" is used herein to define any material having a rigidity greater than that of said flexible weldable material but less than that of board (as herein defined).

The outer spine preferably consists at least partially of flexible weldable material but may also include semi-rigid weldable material. In particular, the outer spine preferably includes a strip of semi-rigid weldable material enclosed in flexible weldable material. In this case, the two boards and the intermediate strip are preferably enclosed between two continuous sheets of flexible material.

In an alternative construction, the two boards are enclosed between a first continuous sheet of flexible material and a second continuous sheet of semi-rigid material, the outer spine then being constituted solely by said flexible and said semi-rigid materials.

If desired, a plurality of welds may be produced between said flexible and semi-rigid materials, each weld extending substantially across the width of the outer spine and the welds being spaced along the length of the spine. Alternatively each weld may extend along the length of the spine.

The flexible weldable material may be a synthetic resin material, in particular, flexible polyvinyl chloride sheeting. The semi-rigid weldable material may also be a synthetic resin material, in particular, polyvinyl chloride sheeting with a low plasticiser content to give it the desired degree of rigidity.

The inner spine preferably consists of a strip of board enclosed in flexible weldable material, the width of the material enclosing the strip being greater than the width of the strip so that two two-layer flexible hinge portions are produced. In this case, the welds extending along the hinge lines unite respective ones of the covers with the flexible material enclosing the inner spine and constituting said hinge portions. These hinge-line welds preferably unite the flexible material enclosing the inner spine with the flexible and semi-rigid materials enclosing the covers or the flexible material enclosing the covers and the strip of semi-rigid material in the outer spine. Since the material enclosing the covers will normally be under tension during this welding process, the welds are preferably made non-continuous to reduce the danger of tearing during this process.

The paper-retaining means may be in the form of a ring or post binder mechanism, riveted to the inner spine or may be constituted by a plurality of longitudinal strips, each having a longitudinally extending slot, the walls of which surround the inner spine and are preferably parallel. These paper-retaining strips may be formed from a resilient synthetic resin material and the outer periphery of each of said strips may be generally rectangular except that one corner of each end of the strip is preferably curved.

From another aspect the invention consists in a method of manufacturing a loose leaf binder, wherein two spaced boards are enclosed in weldable material to form two covers hingeable with respect to an outer spine consisting at least partially of said weldable material, and wherein a flat strip enclosed in flexible weldable material and provided with paper-retaining means is hingedly connected to said covers by means of welds extending substantially along the lines of the adjacent edges of the boards, the width of said flat strip being less than that of said outer spine so that said outer spine tends to assume an outwardly curved shape.

In carrying out a method in accordance with the invention, a first sheet of flexible weldable material may be laid on a flat surface and two boards may be placed side by side thereon with a strip of semi-rigid material below and in overlapping relation and extending between them, the boards and the strip being covered by a further sheet of flexible material and being enclosed between the two sheets by high-frequency welding around the periphery of the boards. In this case, portions of the welds serve to unite the two sheets of flexible material and the strip of semi-rigid material across the outer spine. The welding of the inner spine to the covers is preferably carried out in a jig locating the inner spine and with edge locating means forcing the two covers laterally toward each other so that the outer spine is caused to assume a curved shape within a channel forming part of the welding electrode tool. Any printing required on the outer spine is carried out before the insertion of the inner spine since the outer spine is still flat at this stage.

Methods of performing the invention will now be described with reference to the accompanying diagrammatic drawings, in which:

FIG. 3 is a cross-sectional view of the product illustrated in FIG. 2;

FIG. 5 is a perspective view of a portion of a binder in accordance with the invention, with the covers substantially closed;

Figure 6:
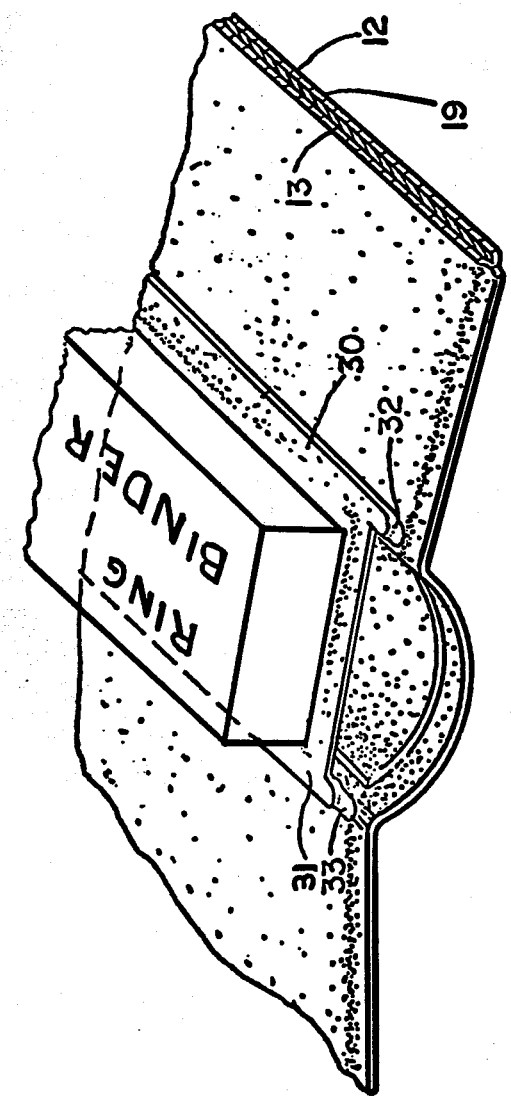

and FIG. 6 is a fragmentary perspective of the loose leaf binder of the present invention having a ring binder illustratively attached thereto.

Figure 1:
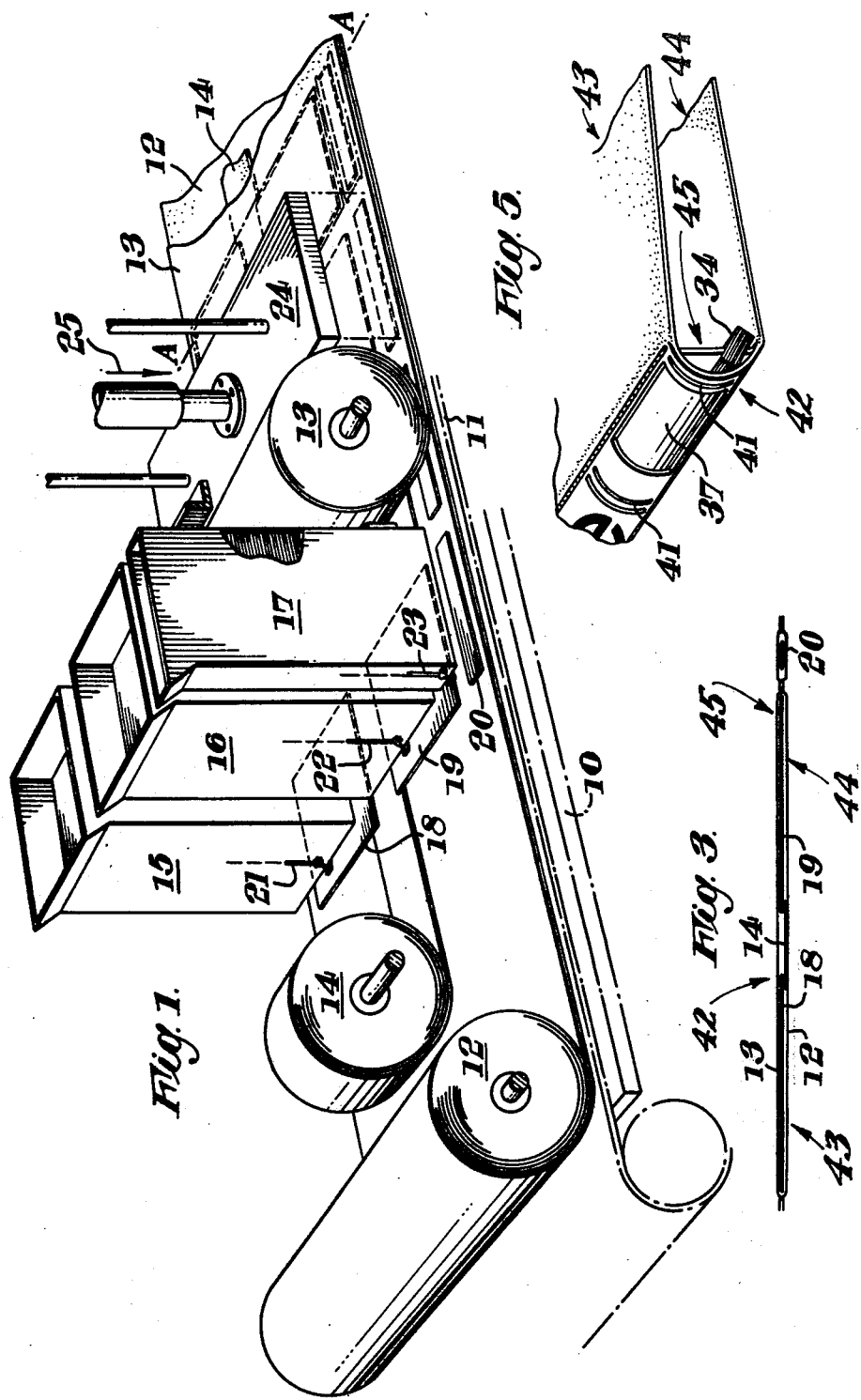
FIG. 1 illustrates apparatus for carrying out a part of the method in accordance with the invention.
Figure 2:
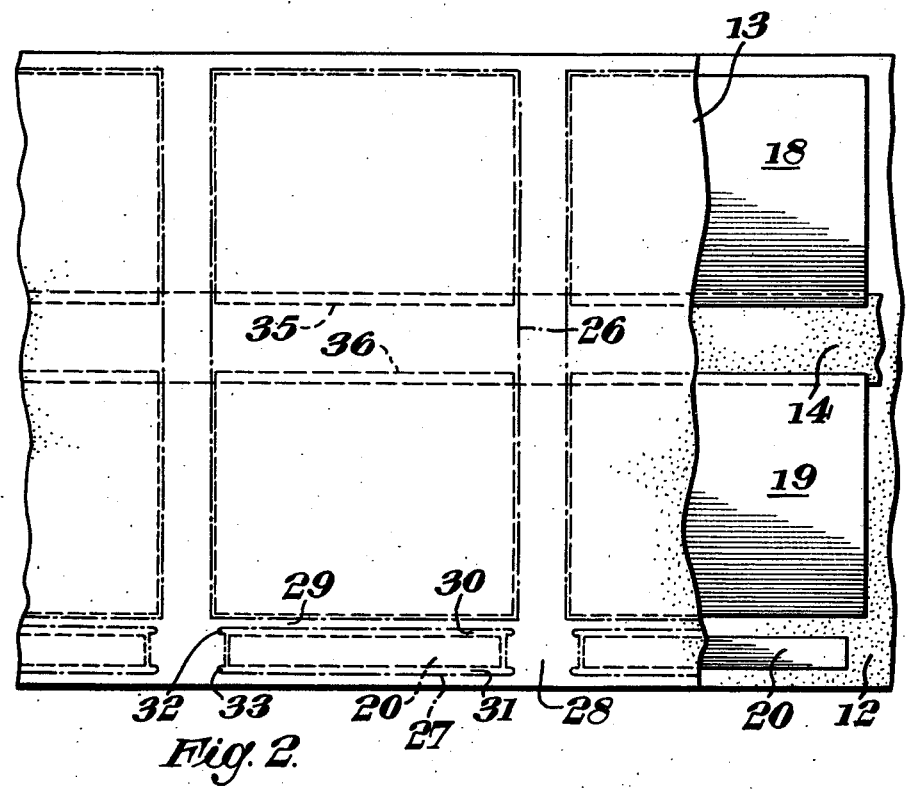
FIG. 2 is a plan view of the product of the apparatus illustrated in FIG. 1.

The apparatus illustrated in FIG. 1 includes a table 10 provided with a conveyor which is diagrammatically illustrated at 11. The conveyor moves intermittently to the right in FIG. 1 and carries with it the various materials for forming the product illustrated in FIG. 2. These materials include a first roll of flexible polyvinyl chloride sheeting 12, a second roll of flexible polyvinyl chloride sheeting 13 and a reel 14 of polyvinyl chloride having a low plasticiser content so that it is semi-rigid and has the desired degree of resilience. Hoppers 15 and 16 contain stacks of cardboard sheets such as those shown at 18 and 19, and a hopper 17 contains a stack of cardboard strips such as that shown at 20. Feed means such as those illustrated diagrammatically at 21, 22 and 23 serve to release the sheets and strips of cardboard one at a time on to the polyvinyl chloride sheeting 12. It will be seen that the arrangement is such that the strip of semi-rigid material from the reel 14 lies on the sheet of flexible polyvinyl chloride from the roll 12 and that the two cardboard sheets 18 and 19 lie on the flexible polyvinyl chloride sheeting and also partly on the semi-rigid polyvinyl chloride strip since the spacing between the boards 18 and 19 is less than the width of the strip of semi-rigid polyvinyl chloride. The boards and the strip of semi-rigid polyvinyl chloride are covered by the flexible polyvinyl chloride sheeting from the roll 13 and pass through a press 24 having a high-frequency welding electrode. When each pair of boards and the associated strip are located beneath the press, the motion of the conveyor 11 is arrested and the press moves downwardly in the direction of the arrow 25. As a result, line welds are produced around the periphery of the two boards, as indicated by the chain-dotted line 26 in FIG. 2. At the same time, a weld is produced around the periphery of the cardboard strip 20, as indicated by the chain-dotted line 27 in FIG. 2. It will be seen that the weld 26 extends across the strip 14 and, at this point, the two sheets 12 and 13 and the strip 14 are united. Although the weld 26 does not extend along the inner edges of the two boards, the peripheral weld is sufficient to hold the two boards firmly in place within the two sheets of polyvinyl chloride.

The welding press 24 thus serves not only to produce the peripheral welds 26 around the boards 18 and 19, the materials 12, 13 and 14, and the peripheral weld 27 around the board 20, but makes it possible to easily remove the connecting material of the sheets 12, 13 and 14, as indicated by the numeral 28, between the welds 26 around the pairs of successive boards 18 and 19 which thus separates the pairs of cover boards and their covering to provide one of the units, and to enable the removal of connecting material of the sheets 12 and 13 as indicated at 29 between the welds for the holding of the boards 19, and weld 27 around the strip 20 to separate that component from the other to provide the other unit. Thus, a series of component parts are produced after separation, one part being the covers 43 and 44 with their connecting spine 42 and the other part being the inner spine 45, as defined by the board 20 and the material between the board and the weld 27 around the board. While the peripheral weld around the two boards 18 and 19 is very close to the edges of the boards, the portions of the peripheral weld 27 extending along the sides of the cardboard strip 20 are spaced somewhat from the edges of the strip so that two flexible hinge portions 30 and 31 are produced along the two edges of the inner spine 45. At the ends of the inner spine, on the other hand, the weld is, for the most part, close to the respective ends of the cardboard strip but projecting ears 32 and 33 are produced constituting extensions of the flexible hinge portions 30 and 31.

After the manufacture of the inner spine 45, any required paper-retaining means is attached thereto before the inner spine is joined to the two covers 43 and 44 and the outer spine 42. This paper-retaining means may be, for example, in the form of a conventional ring binder mechanism which may be riveted to the inner spine. Such ring binder mechanisms are well known in the art as, for example, shown in expired U.S. Pat. No. 2,013,552 to Dawson.

Figure 4:
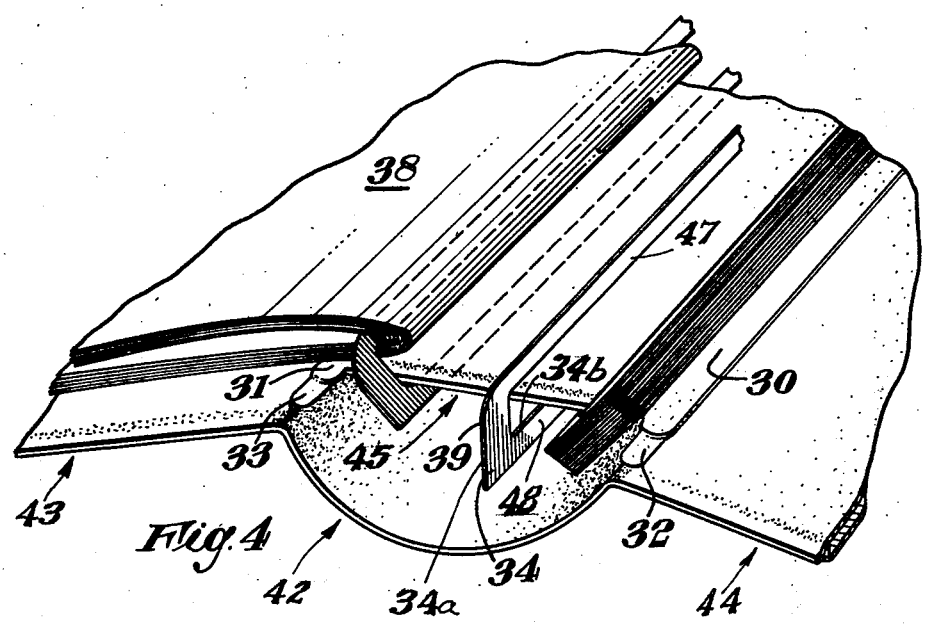
FIG. 4 is a perspective view of a portion of a binder in accordance with the invention, with the covers open.

Alternatively, the paper-retaining means may be in the form of a plurality of elongated slotted strips, as shown at 34 in FIGS. 4 and 5, such strips including end parts 34a and an elongated slot 34b. At this stage also, any printing required on the outer spine and on the covers is carried out. It will be understood that, at this stage, the outer spine is flat and, accordingly, normal flat printing blocks or type can be used.

After the printing process and after the paper-retaining means have been secured to the inner spine 45, the inner spine complete with paper retaining means 34 is placed on a jig forming the lower electrode of a high frequency welding press and the component constituting the two covers and the outer spine is located at its edges on the same jig so that the outer spine is caused to assume a curved shape within the channel of a welding electrode attached to the press head. When the machine is operated by bringing together the electrode on the press head and the lower electrode the two hinge-like portions 30 and 31 of the inner spine are welded to the junctions between the covers and the outer spine. In other words, the welds are produced closely adjacent to the two inner edges of the boards which are indicated at 35 and 36 in FIG. 2. The welds serve to unite the two strips of flexible polyvinyl chloride enclosing the inner spine, the two sheets of flexible polyvinyl chloride enclosing the covers and the strip of semi-rigid polyvinyl chloride sheeting which serves to stiffen the outer spine. To reduce the danger of tearing the outer sheets of polyvinyl chloride enclosing the covers during the welding process, the electrode in contact with this sheet is serrated so as to produce an interrupted weld.

When the binder is removed from the jig, the two covers are held at the spacing set by the jig so that the outer spine retains its curved shape. It will be found that the two covers may now be turned towards each other about the lines of attachment of the hinge portions of the inner spine to the covers and during this movement the outer spine will still retain its curved shape due to the presence of the strip of semi-rigid polyvinyl chloride 14.

For some purposes, it is required that a label or the like should be attached to the outer spine to indicate, for example, one of a series of volumes. For this purpose, it is desirable that a recess should be provided in the outer spine so that, when the label is attached, it is flush with the remainder of the outer spine. It is to be understood that such a recess which is indicated by the reference numeral 37 in FIG. 5, can readily be produced by welding together the materials constituting the outer spine in the welding press 24. In addition to, or instead of, the welded panel, it is possible to provide a number of line welds 41 extending across the width of the outer spine and spaced along the length of the spine. These welds may serve a structural, as well as a decorative purpose, and may, if desired, be longitudinal instead of transverse.

Various alternative methods of construction may be used without losing the advantages provided by the invention. For example, the roll 13 of flexible polyvinyl chloride sheeting could be replaced by a roll of semi-rigid polyvinyl chloride sheeting and, in this case, the reel 14 of semi-rigid polyvinyl chloride strip may be dispensed with. If this is done, the whole of the inside of the binder would be covered with semi-rigid polyvinyl chloride sheeting and the outer spine would be constituted solely by a part of this covering material and a part of the sheet of flexible polyvinyl chloride covering the outside of the binder.

If desired, the two boards which impart rigidity to the two covers may be omitted, particularly if the semi-rigid polyvinyl chloride sheeting is used for the inner covering of the binder, as described in the preceding paragraph.

As can be seen most clearly in FIG. 4, the slotted strips 34 have parallel sides 47 and 48 which define the slot 34b and surrounds the inner spine 45. The width of the slot in each strip is sufficient to allow the pages of a magazine or the like to be inserted, as shown at 38. The strips preferably consist of a resilient synthetic resin material and the outer periphery of each strip is generally rectangular but one corner at each end of each strip is curved, as shown at 39.

When a binder of the kind shown in FIG. 4 is in use, magazines, periodicals or the like are inserted through the slots in the strips 34 and it will be found that they are firmly held without the need for any secondary support. Even when the binder and its contents are stood upright, the strips and the magazines tend to hang vertically, the bottom edges of the pages resting on the lower ends of the slots and the tops of the magazine pages abutting the forward edges of the slots.

What I claim as my invention and desire to secure by Letters Patent of the United States is:

1. A loose leaf binder comprising two substantially rigid covers hingeable with respect to a substantially semi-rigid outer curved spine along each of its two longitudinal edges, said outer curved spine being integrally formed with said covers, an inner rigid flat spine hingedly connected along each of its two longitudinal edges to said covers by means of welds extending substantially along hinge lines between said covers and said outer spine, and paper-retaining means for releasably retaining paper, said paper retaining means being provided on said inner spine, each of said covers comprising a board covered on the outside and enclosed in flexible weldable material, said outer spine including an intermediate strip of semi-rigid weldable material enclosed in said flexible weldable material, the two board and the intermediate strip being enclosed between two continuous sheets of said flexible material, said binder including a plurality of welds between said flexible and semi-rigid materials, each weld extending substantially across the width of the outer spine and the welds being spaced along the length of the spine.

2. A loose leaf binder comprising:
two substantially rigid covers hingeable with respect to a substantially semi-rigid outer curved spine along each of its two longitudinal edges,
said outer curved spine being integrally formed with said covers,
an inner rigid flat spine hingedly connected along each of its two longitudinal edges to said covers by means of welds extending substantially along hinge lines between said covers and said outer spine, and
paper-retaining means for releasably retaining paper, said paper-retaining means being provided on said inner spine,
wherein said inner spine comprises a strip of board enclosed in flexible weldable material, the width of the material being greater than that of the strip of board so that flexible hinge portions are produced along the two longitudinal edges of the strip,
wherein the welds extending along the hinge lines unite respective ones of said hinge portions with the covers,
wherein said outer spine includes a strip of semi-rigid weldable material enclosed in said flexible weldable material, and
wherein each of the hinge-line welds unites the flexible material enclosing the covers, the strip of semi-rigid material and the flexible material enclosing the inner spine.

3. A binder as claimed in claim 2, wherein said hinge-line welds are non-continuous.

4. A binder as claimed in claim 2, wherein the paper-retaining means are constituted by a plurality of longitudinal strips each having a longitudinally extending slot, the walls of which surround the inner spine.

5. A binder as claimed in claim 4, wherein the sides of the slots are parallel.

6. A binder as claimed in claim 4, wherein the paper-retaining strips are formed from a resilient synthetic resin material.

7. A binder as claimed in claim 4, wherein the outer periphery of each of said paper-retaining strips is generally rectangular, but one corner of each end of the strip is curved.

8. A loose leaf binder comprising:
a semi-rigid curved outer spine having first and second side edges;
two covers, each having a side edge;
a first hingeable portion interconnecting said outer spine first side edge and a side edge of one of said covers;
a second hingeable portion interconnecting said outer spine second side edge and a side edge of the other of said covers;
said first and second hingeable portions having at least a part thereof formed of weldable material;
a rigid, flat inner spine having first and second side edges;
a third hingeable portion, at least a part thereof formed of weldable material, extending from said inner spine first side edge;
a fourth hingeable portion, at least a part thereof formed of weldable material, extending from said inner spine second side edge;
weld means for coupling said first hingeable portion to said third hingeable portion, and for coupling said second hingeable portion to said fourth hingeable portion; and
paper-retaining means, coupled to said inner spine, for releasably retaining paper thereon,
wherein said outer spine includes at least one sheet of flexible material and a sheet of semi-rigid material,
wherein said outer spine sheet of semi-rigid material extends past said first and second hingeable portions.

9. A binder as claimed in claim 8, wherein each of said covers comprises a board covered on the outside with flexible weldable material.

10. A binder as claimed in claim 9, wherein each of said covers comprises a board enclosed in flexible weldable material.

11. A binder as claimed in claim 9, wherein the said outer spine consists, at least partially, of said weldable material.

12. A binder as claimed in claim 9, wherein the flexible weldable material is a synthetic resin material.

13. A binder as claimed in claim 12, wherein the said flexible material is flexible polyvinyl chloride sheeting.

14. A loose leaf binder comprising:
a semi-rigid curved outer spind having first and second side edges;
two covers, each having a side edge;
a first hingeable portion interconnecting said outer spine first side edge and a side edge of one of said covers;
a second hingeable portion interconnecting said outer spine second side edge and a side edge of the other of said covers;
said first and second hingeable portions having at least a part thereof formed of weldable material;
a rigid, flat inner spine having first and second side edges;
a third hingeable portion, at least a part thereof formed of weldable material, extending from said inner spine first side edge;
a fourth hingeable portion, at least a part thereof formed of weldable material, extending from said inner spine second side edge;
weld means for coupling said first hingeable portion to said third hingeable portion, and for coupling said second hingeable portion to said fourth hingeable portion; and
paper-retaining means, coupled to said inner spine, for releasably retaining paper thereon,
wherein said covers and said outer spine comprise
two four-sided boards having two sides adjacent and spaced apart,
a semi-rigid weldable strip of material having opposite side edges, each side edge overlapping one of the adjacent sides of one of said boards,
two sheets of flexible weldable material enclosing said boards and said strip, and
weld means for coupling said two sheets and said strip together adjacent the peripheries of said boards.

15. A loose leaf binder according to claim 14 wherein said inner spine comprises a rigid board enclosed by two sheets of flexible weldable material welded together about the periphery of said board, and
said sheets of flexible weldable material extend beyond the first and second side edges of said board and are welded together to form said third and fourth hingeable portions.

* * * * *